United States Patent [19]

Mochizuki

[11] Patent Number: 4,645,473
[45] Date of Patent: Feb. 24, 1987

[54] TORQUE TRANSMITTING COUPLING WITH OBTUSE SCREW EDGE ANGLES

[76] Inventor: Masanori Mochizuki, 1-28, Yasunakacho 4-chome, Yao-shi, Osaka-fu, Japan

[21] Appl. No.: 748,562

[22] Filed: Jun. 25, 1985

[30] Foreign Application Priority Data

Jul. 12, 1984 [JP] Japan ............................. 59-145505
Nov. 21, 1984 [JP] Japan ............................. 59-246696
Feb. 26, 1985 [JP] Japan ............................. 60-38451

[51] Int. Cl.$^4$ ............... F16B 2/06; F16D 1/00; F16D 3/50
[52] U.S. Cl. ................................ 464/79; 403/290; 403/314; 464/182
[58] Field of Search ............... 403/104, 290, 309, 314; 464/79, 80, 182; 411/436

[56] References Cited

U.S. PATENT DOCUMENTS

| | | | |
|---|---|---|---|
| 901,422 | 10/1908 | Cook | 403/314 |
| 904,341 | 11/1908 | Lindstrom | 403/314 |
| 1,672,488 | 6/1928 | Hall | 403/314 X |
| 1,782,324 | 11/1930 | Tessky | 464/182 X |
| 2,564,019 | 8/1951 | Martin, Jr. | 403/290 X |
| 3,142,239 | 7/1964 | Meixner | 411/436 X |
| 3,232,076 | 2/1966 | Sundt | 464/79 |
| 4,441,837 | 4/1984 | Mastroni | 403/314 X |
| 4,464,140 | 8/1984 | Lundgren | 403/314 X |

FOREIGN PATENT DOCUMENTS 54-40703  12/1979  Japan .

*Primary Examiner*—Stuart S. Levy
*Assistant Examiner*—Daniel P. Stodola
*Attorney, Agent, or Firm*—Cushman, Darby & Cushman

[57] ABSTRACT

The shaft coupling has two elastic threaded cylindrical parts on both sides. The threaded cylindrical parts have tapered screws on their outer surface. Tightening nuts are fitted to the tapered screws. Inserting shafts into the threaded cylindrical parts, an operator rotates the nuts to tighten the shafts. The threaded cylindrical parts are elastically bent inward and pressed on the shafts by rotationally-symmetric forces. The tapered screws with wide screw edge angle or with saw-shaped section are preferable to heighten the transmission performance of torques.

1 Claim, 8 Drawing Figures

TORQUE TRANSMITTING COUPLING WITH OBTUSE SCREW EDGE ANGLES

BACKGROUND OF THE INVENTION

This invention relates to a shaft coupling.

Various kind of shaft couplings such as universal joint, ball joint or Oldham's joint suitable for the conditions imposed upon the driving shaft and the driven shaft have been proposed.

However these improvements of shaft couplings have been confined to the joint mechanism between driving shaft and driven shaft. No improvement has been done with the connections between shafts and shaft coupling.

Typical connection between shafts and shaft coupling is a key-fixation connection or a bolt-fixation connection. The key-fixation connection comprises keygrooves shaped on the outer surface of the shaft and on the inner surface of the cylindrical part of shaft coupling, and a key to be penetrated into the space formed by the key grooves. The key-fixation connection has widely used in various kind of machines. However the key-fixation connection has defaults that processing of key grooves is difficult work and that backlashes between shafts and shaft coupling are liable to occur when the shafts rotate in reciprocal directions.

The bolt-fixation connection comprises a shaft, a cylindrical part with a radially-bored bolt hole and a fixation bolt penetrating in the bolt hole and pushing a side point of the shaft. This connection is free from the difficulty of processing and the occurrence of backlashes. However the bolt-fixation connection has another difficulty-eccentricity. Because the shaft is pushed by the fixation bolt along a radial direction in the cylindrical part, the shaft center deviates from the center of the cylindrical part. In addition to the eccentricity between the shaft and the cylindrical part, another eccentricity is derived from the aberrance of center of gravity of the cylindrical part, because the cylindrical part has a single fixation bolt along a radius.

Because of the two eccentricities, the center of gravity of shaft coupling deviates from the center of driving shaft or driven shaft. The deviation of centers will induce strong transversal vibrations of shaft coupling when the shafts rotate at high speed.

SUMMARY OF THE INVENTION

An object of the invention is to provide a shaft coupling which prevents the occurrence of eccentricity between shafts and shaft coupling.

Another object of the invention is to provide a shaft coupling which kills the backlashes between shafts and shaft coupling.

Further object of the invention is to provide a shaft coupling with high performance of torque transmission.

Other object of the invention is to provide a shaft coupling which has a wide applicability to various kind of joint mechanisms.

The improvement brought about by this invention relates not to the joint mechanism itself but to the connection between shafts and shaft coupling.

The shaft coupling of this invention comprises a joint portion, two threaded cylindrical parts with tapered screw fixed on sides of the joint portion for receiving driving shaft and driven shaft and tightening nuts for tightening the threaded cylindrical parts around the shafts.

The characteristics of the invention are that the cylindrical part for receiving driving and driven shafts is a threaded cylindrical part with tapered outer screw which can be elastically bent inward and a tightening nut fitted to the tapered screw tightens the threaded cylindrical part around the shaft.

By the tightening forces of the tightening nuts the inner surface of the threaded cylindrical parts are bent inward and strongly pressed upon the outer surfaces of the shafts. Two shafts are coupled with the cylindrical parts by the forces with rotation symmetry.

Because whole inner surfaces of the cylindrial parts contact with the shafts, there is no backlash between the cylindrical parts and the shafts.

Because the tightening nuts bend inward the cylindrical parts by the rotationally-symmetric force, no eccentricities occur between shafts and shaft coupling.

DETAILED DESCRIPTION OF THE EMBODIMENTS

Figure 1:
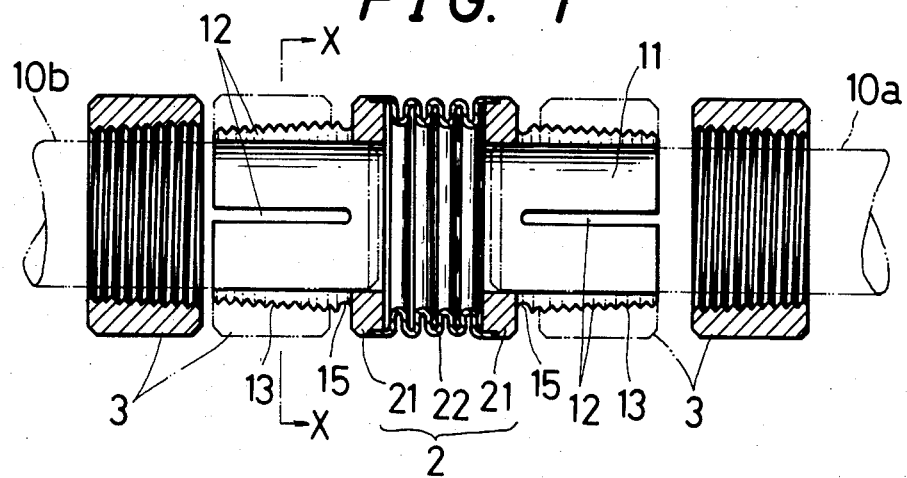
FIG. 1 is a disassembled sectional view of an embodiment of this invention applied to a universal joint of bellows type.
Figure 2:
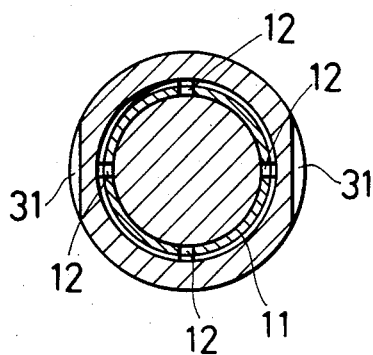
FIG. 2 is a sectional view taken along a line X—X in FIG. 1 in the connected state.
Figure 3:
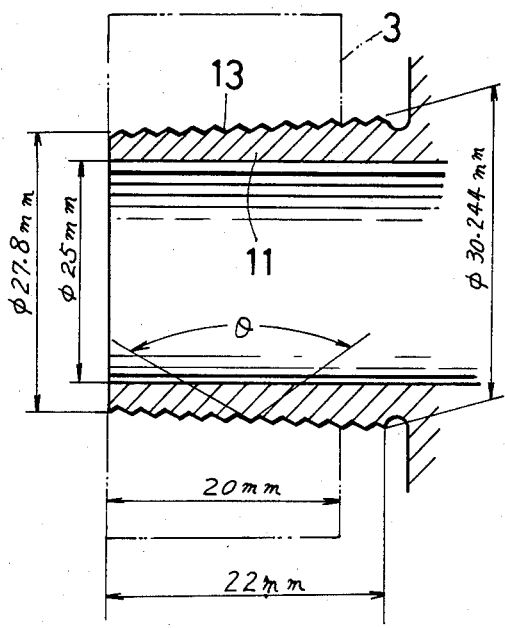
FIG. 3 is an enlarged sectional view of the threaded cylindrical part of the embodiment.

An embodiment of the invention is shown in FIG. 1, FIG. 2 and FIG. 3. This is an application of this invention to a universal joint of bellows type.

The shaft coupling consists of a joint portion (2) and two threaded cylindrical parts (11). The joint portion (2) comprises an elastic bellows (22) and two side flanges (21) which are the base ends of the threaded cylindrical part (11). The threaded cylindrical parts (11) protrude in both sides of the joint portion (2).

The threaded cylindrical parts (11) have a tapered screw on its outer surface whose diameter decreases along externally-orientated directions. Two circular grooves (15) are shaped between the flanges (21) and the inner ends of the threaded cylindrical parts (11). Four slits (12) are shaped along an axial direction on each of the threaded cylindrical parts (11) ( see FIG. 1 and FIG. 2 ).

Tightening nuts (3) have tapered inner female screws corresponding to the tapered screws (13) of the threaded cylindrical part (11). A pair of parallel flat surfaces (31) and (31) is formed on an outer surface of the tightening nut (3). A tool such as a spanner can be fitted on the flat surfaces (31) to rotate the tightening nut (3).

The connecting operation will now be explained.

First, both tightening nuts (3) are loosely screwed onto the outer portions of the tapered screws (13) as shown by doubly-dotted thin line (imaginary lines) in FIG. 1. Second, a driving shaft (10a) and a driven shaft (10b) are inserted into the threaded cylindrical parts (11) as shown by doubly-dotted thin lines. Thirdly, the tightening nuts (3) are rotated to displace inward along the axial direction. The threaded cylindrical parts (11) are bent inward and are pressed upon the outer surfaces of the shafts (10a) and (10b).

Two shafts (10a) and (10b) are connected through the shaft coupling by the uniform friction forces with rotation symmetry. Then the two shafts are in the torque transmission state. Namely the torque of the driving shaft (10a) is transmitted in succession through the threaded cylindrical part (11), the joint portion (2) and the other threaded cylindrical part (11) to the driven shaft (10b).

In the connected state the tightening nuts (3) are fitted around the threaded cylindrical parts (11) with a concentric coordination. Thus the center axis of gravity of the connected portion coincides with the center axis of the threaded cylindrical parts (11).

Furthermore no backlashes happen between shafts and shaft coupling, because whole of the inner surfaces of the threaded cylindrical parts (11) are uniformly pressed upon the outer surfaces of the shafts.

This Inventor has been aware that the thread shape of the tapered screw has a great influence upon the strength of transmission torque between the threaded cylindrical parts (11) and the driving shaft (10a), or the driven shaft (10b).

For example three specimens having same sizes of parts shown in FIG. 3 with different flank angles have been made to be compared. The effective screw length is 22 mm. The width of nut is 20 mm. The inner diameter is 25 mm$\phi$. The outer diameter of the outer end is 27.8 m$\phi$. The outer diameter of the inner end is 30.244 mm$\phi$. The screw pitches of the three specimens are common.

But the specimens have different screw edge angles. The screw edge angles of the specimens NO. 1, NO. 2 and NO. 3 are 60 degrees, 120 degrees and 150 degrees. Then the Inventor has measured the maximum transmission torques of the specimens NO. 1 to NO. 3, keeping the tightening torques of nuts in common—40 kgm.

The results are shown in Table 1.

TABLE 1

| SPECIMEN NO. | Maximum Transmission Torques Screw Edge Angles | | |
|---|---|---|---|
| | SCREW EDGE ANGLE | MAXIMUM TRANSMISSION TORQUE | TIGHTENING TORQUE OF NUT |
| 1 | 60° | 18 kgm | 40 kgm |
| 2 | 120° | 37 kgm | 40 kgm |
| 3 | 150° | 44 kgm | 40 kgm |

This experiment shows that a bigger screw edge angle enables us to transmit a bigger torque under the condition of the same tightening torques of nuts.

Figure 4:
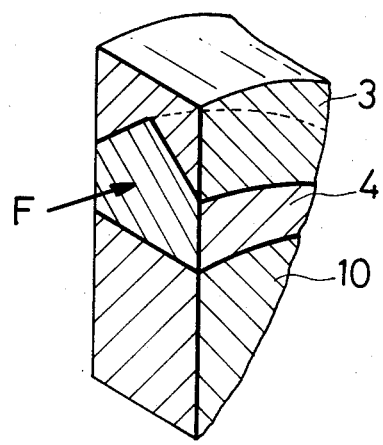
FIG. 4 is a perspective sectioned view of a connection part for explaining the tightening action of nut.

The Inventor supposes the ground of this phenomenon as follows. The mechanism that the tightening nut (3) presses the threaded cylindrical part (11) upon the driving shaft (10a) or the driven shaft (10b) can be safely deemed to be equivalent to the mechanism that a single female thread of the nut (3) presses a circular wedge (4) having a pentagonal section same with one male thread of the threaded cylindrical part (11) upon the shaft (10) as shown in FIG. 4.

In this simplified mechanism a bigger screw edge angle clearly makes a bigger pressure acting between the wedge (4) and the shaft (10) under the condition of constant penetrating force (F) of the wedge (4), because the pressure acting upon the contact region of the nut (3) and the shaft (10) can be transmitted to the wedge (4) with a higher efficiency by a bigger edge angle of wedge.

In this analogy the edge angle of wedge corresponds to the screw edge angle of the tapered screw (13) and the penetrating force (F) for pushing the wedge inward corresponds to the tightening torque of the nut (3). Accordingly the bigger screw angle is able to enlarge the maximum transmission torque under the constant tightening torque of nut.

A narrow circular surface of a single thread is called a "flank". The inner-inclined flank is called a "pressure flank", because this flank receives a strong pressure. The outer-inclined flank is called a "clearance flank", because this flank does not contact with a flank of other screw in the case of tight coupling of screws.

The flanks of the tapered screw (13) are symmetric with planes perpendicular to the axial direction of the threaded cylindrical part (11) in the example shown in FIG. 3. Another dispositions of screw flanks are allowable.

Figure 5:
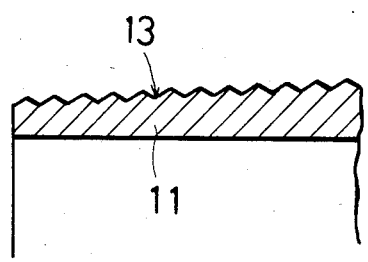
FIG. 5 is a sectional view of another example of threaded cylindrical part.

FIG. 5 shows another example of tapered screw (13) whose flanks are symmetric with slant planes perpendicular to the surface of the tapered screw (13). This example has more appropriate tapered screw (13) having pressure flanks wider than that of the example of FIG. 3. Furthermore the flank angle held between the pressure flank and the axial line is smaller than that of the example of FIG. 3. The wider pressure flank and the smaller flank angle enlarges the maximum transmission torque under the constant tightening torque of nut.

Figure 6:
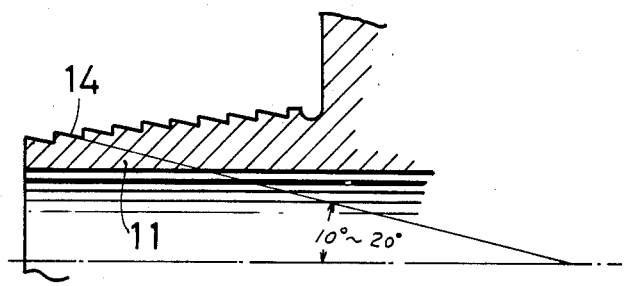
FIG. 6 is a sectional view of the other example of threaded cylindrical part.

FIG. 6 shows another example of tapered screw with higher performance of torque transmission. The sectional shape of the tapered screw resembles a saw. The clearance flank of the saw-shaped tapered screw is perpendicular to the axial line of the threaded cylindrical part (11). The pressure flank has a small flank angle to the contrary. The flank angle of the pressure flank is 10 to 20 degrees.

In this example nearly whole of the contacting regions of the nut (3) and the threaded cylindrical part (11) is occupied by the pressure flanks. The widest pressure flanks are able to transmit the largest torque between the threaded cylindrical parts (11) and the driving or driven shafts under the condition of constant tightening torque of nut.

In practice too small screw pitch is forbidden on account of the difficulty of work, although smaller screw pitch is more desirable to avoid excess thinning of the threaded cylindrical part (11).

However even in the case of large screw pitch, the screw with wide edge angle or the saw-shaped screw enables us to keep the effective thickness of the threaded cylindrical part (11) in an appropriate range.

In other words even a considerably thin threaded cylindrical part ensures a reasonable width of screw pitch in these cases. The thin threaded cylindrical part is able to raise the elasticity of the threaded cylindrical part (11). Thus the maximum transmission torque under the constant tightening torque of nut can be raised through the thin threaded cylindrical part in the case of the screw with wide edge angle or the saw-shaped screw.

The screw with wide edge angle or the saw-shaped screw has another advantage. Because of the high elasticity, the outer ends of the threaded cylindrical parts are easily bent inward and pressed upon the shafts at the beginning of tightening tapered screws by nuts. The shafts are fixed by the pressure of the threaded cylindrical parts at an early stage of tightening. The pressure prevents the shaft joint from rotating with the tightening nuts. Accordingly there is no need to fix the shaft coupling by a tool while the nut is tightened.

The improvement brought about by this invention relates to the connections between shafts and shaft coupling. This invention has wide applicability to various kind of shaft couplings.

Figure 7:
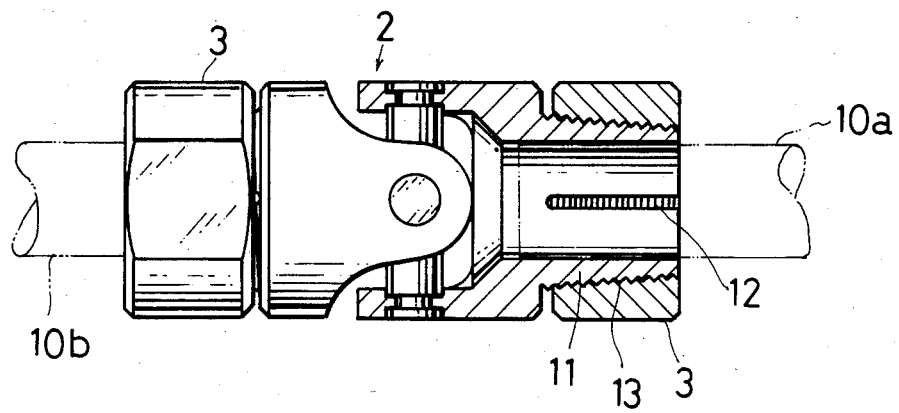
FIG. 7 is a partially sectioned front view of another embodiment of the invention applied to a universal joint of transverse-axes type.

FIG. 7 shows another embodiment. This is a universal joint with two traversely coupled axes. The connection parts are improved by this invention.

Figure 8:
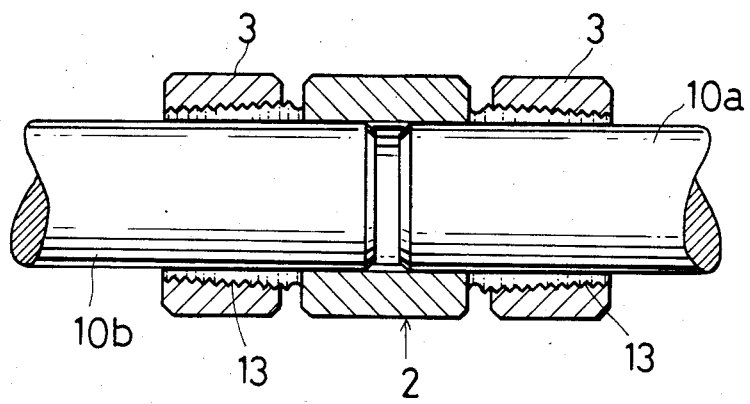
FIG. 8 is a sectional view of a further embodiment of the invention applied to a straight joint.

FIG. 8 shows the other embodiment. This is a straight shaft coupling. The shaft coupling transmits thrust force in addition to rotation force. The connection parts between shafts and shaft coupling are improved by this invention.

Furthermore this invention can be applied to another kind of shaft coupling also.

The shaft coupling of the invention can be made from metals, plastics or compositions of metals and plastics. According to the special requirements more elastic materials such as rubber can be used to compose some portions of the shaft coupling.

What is claimed is:

1. A shaft coupling with improved torgue transmission properties comprising:
   a joint element;
   two tapered elastic cylindrical screws with threads on outer surface thereof, each cylindrical screw having slits parallel thereto in the axial direction thereof, one of said screws being fixed to each side of said joint element; and
   two tightening nuts with threads on the inner surface thereof for fitting to said tapered screws, wherein the threads of said tapered screws and tightening nuts each difine obtuse edge angles of 120° to 150°.

* * * * *